(12) United States Patent
Zhou et al.

(10) Patent No.: US 7,310,580 B2
(45) Date of Patent: Dec. 18, 2007

(54) METHOD FOR BOREHOLE MEASUREMENT OF FORMATION PROPERTIES

(75) Inventors: Minyao Zhou, Somerville, NJ (US); Hans Thomann, Bedminister, NJ (US); Stuart Ronald Keller, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/318,786

(22) Filed: Dec. 13, 2002

(65) Prior Publication Data

US 2003/0151975 A1    Aug. 14, 2003

Related U.S. Application Data

(63) Continuation-in-part of application No. 09/973,529, filed on Oct. 9, 2001, now abandoned, which is a continuation-in-part of application No. 09/686,735, filed on Oct. 10, 2000, now abandoned.

(51) Int. Cl.
*G01V 1/40* (2006.01)
*G06G 7/48* (2006.01)

(52) U.S. Cl. .......................... 702/6; 703/10
(58) Field of Classification Search ............... 702/1–8, 702/9–14; 175/45; 710/3; 367/82, 73, 25, 367/30, 45; 324/339; 703/1–10
See application file for complete search history.

(56) References Cited

U.S. PATENT DOCUMENTS

| | | | |
|---|---|---|---|
| 3,812,457 A | 5/1974 | Weller | 340/15.5 |
| 4,003,017 A | 1/1977 | Bailey | 340/15.5 |
| 4,144,949 A | 3/1979 | Silverman | 181/106 |
| 4,207,619 A | 6/1980 | Klaveness | 367/36 |
| 4,460,059 A | 7/1984 | Katz | 181/102 |

(Continued)

FOREIGN PATENT DOCUMENTS

GB    2 312 008 A    10/1997

(Continued)

OTHER PUBLICATIONS

O'Hara, Stephen G., 1985, "Influence of Pressure, Temperature, and Pore Fluid on the Frequency-Dependent Attenuation of Elastic Waves in Berea Sandstone," Physical Review A, vol. 32, No. 1, pp. 472-488.

(Continued)

*Primary Examiner*—Bryan Bui
*Assistant Examiner*—Victor J. Taylor
(74) *Attorney, Agent, or Firm*—Ropes and Gray, LLP

(57) ABSTRACT

The present invention is a method of estimating formation properties by analyzing acoustic waves that are emitted from and received by a bottom hole assembly. A bottom hole assembly may be deployed in a borehole to estimate formation properties. From the bottom hole assembly, a source signal may be emitted and at least one signal may be received by one or more receivers in the bottom hole assembly. Analysis of the frequency dependent characteristics of the received signal allows the estimation of the formation properties of interest, including pore pressure. The formation properties of interest may be used to monitor a wellbore pressure safety margin and to optimize drilling and weight.

25 Claims, 6 Drawing Sheets

U.S. PATENT DOCUMENTS

| | | | | |
|---|---|---|---|---|
| 4,718,048 | A | | 1/1988 | Staron et al. .................. 367/40 |
| 4,829,489 | A | | 5/1989 | Rector .......................... 367/82 |
| 4,849,945 | A | | 7/1989 | Widrow ........................ 367/30 |
| 4,862,423 | A | | 8/1989 | Rector .......................... 361/25 |
| 4,873,675 | A | | 10/1989 | Barr, Jr. et al. ............... 367/57 |
| 4,954,998 | A | | 9/1990 | Rector .......................... 367/82 |
| 4,964,087 | A | * | 10/1990 | Widrow ........................ 367/45 |
| 4,965,774 | A | | 10/1990 | Ng et al. ....................... 367/75 |
| 5,012,453 | A | | 4/1991 | Katz ............................. 367/57 |
| 5,109,946 | A | | 5/1992 | Sorrells ....................... 181/106 |
| 5,109,947 | A | | 5/1992 | Rector, III ................... 181/106 |
| 5,144,589 | A | | 9/1992 | Hardage ....................... 367/25 |
| 5,144,591 | A | | 9/1992 | Hardage ....................... 367/75 |
| 5,191,557 | A | | 3/1993 | Rector et al. .................. 367/41 |
| 5,200,929 | A | | 4/1993 | Bowers | |
| 5,233,567 | A | | 8/1993 | Calvert ......................... 367/27 |
| 5,242,025 | A | | 9/1993 | Neill et al. | |
| 5,305,285 | A | | 4/1994 | Naville et al. ................. 367/49 |
| 5,372,207 | A | | 12/1994 | Naville et al. .................. 175/1 |
| 5,438,170 | A | | 8/1995 | Klaveness ................... 181/106 |
| 5,511,038 | A | | 4/1996 | Angeleri et al. ............... 367/40 |
| 5,585,556 | A | | 12/1996 | Petersen et al. ......... 73/152.03 |
| 5,678,643 | A | * | 10/1997 | Robbins et al. ............... 175/45 |
| 5,758,539 | A | | 6/1998 | Naville et al. ........... 73/152.03 |
| 5,798,488 | A | | 8/1998 | Naville et al. ............... 181/102 |
| 5,835,883 | A | | 11/1998 | Neff et al. ...................... 702/7 |
| 5,844,132 | A | | 12/1998 | Fabret et al. ............. 73/152.45 |
| 5,881,310 | A | * | 3/1999 | Airhart et al. .................. 710/3 |
| 5,936,913 | A | | 8/1999 | Gill et al. ...................... 367/25 |
| 6,021,377 | A | * | 2/2000 | Dubinsky et al. .............. 702/9 |
| 6,023,444 | A | | 2/2000 | Naville ......................... 367/82 |
| 6,028,534 | A | | 2/2000 | Ciglenec et al. | |
| 6,084,826 | A | * | 7/2000 | Leggett, III .................. 367/82 |
| 6,176,323 | B1 | | 1/2001 | Weirich et al. ............... 175/45 |
| 6,206,108 | B1 | | 3/2001 | MacDonald et al. .......... 175/24 |
| 6,262,941 | B1 | | 7/2001 | Naville ......................... 367/82 |
| 6,344,746 | B1 | * | 2/2002 | Chunduru et al. .......... 324/339 |
| 6,473,696 | B1 | | 10/2002 | Onyia et al. | |
| 6,694,261 | B1 | | 2/2004 | Huffman | |
| 6,751,558 | B2 | | 6/2004 | Huffman et al. | |
| 6,977,866 | B2 | | 12/2005 | Huffman et al. | |

FOREIGN PATENT DOCUMENTS

| WO | WO 00/13046 | 3/2000 |
|---|---|---|
| WO | WO 02/31538 A1 | 4/2002 |

OTHER PUBLICATIONS

O'Hara, Stephen G., 1989, "Elastic-Wave Attenuation in Fluid-Saturated Berea Sandstone," Geophysics, vol. 54, No. 6, pp. 785-788.

Christensen and Wang, 1985, "The Influence of Pore Pressure and Confining Pressure on Dynamic Elastic Properties of Berea Sandstone," Geophysics, vol. 50, No. 2, pp. 207-213.

Hamilton, E.L., "$V_p/V_s$ and Poisson's Ratios in Marine Sediments and Rocks," J. Acoustic Soc. America, vol. 66, No. 4, Oct. 1979, pp. 1093-1101.

Lee, Stan et al., Jun. 1999, "Deepwater reservoir prediction using seismic and geomechanical methods," The Leading Edge, pp. 726-728.

Verm, Richard et al., Feb. 1998, "Significance of geopressure in predicting lithology," The Leading Edge, pp. 227-234.

Castagna, John, P., Jun. 2001, "AVO Analysis," CSEG Recorder, pp. 29-34.

Geophysical Society of Houston Newsletter vol. 33, No. 6, pp. 1 and 3, Feb. 1999.

Barley, Brian, Sep. 18, 1998, "Deepwater Problems around The World," Workshop: Deep Water Exploration & Production Geophysics, Abstracts, 1998 SEG International Exposition and Sixty-Eighth Annual Meeting, pp. 1-5.

Jones, Todd et al., Sep. 18, 1998, "Seismic Imaging Challenges in Deepwater Gulf of Mexico," Workshop: Deep Water Exploration & Production Geophysics, Abstracts, 1998 SEG International Exposition and Sixty-Eighth Annual Meeting, p. 6.

Watkins, Joel S., Sep. 18, 1998, An Overview of the Stratigraphic History of the.

Deepwater Gulf of Mexico, Workshop: Deep Water Exploration & Production Geophysics, Abstracts, 1998 SEG International Exposition and Sixty-Eighth Annual Meeting, p. 7.

Hilterman, Fred, Sep. 18, 1998, "Rock Property Framework For Comprehending Deep-Water Seismic Response," Workshop: Deep Water Exploration & Production Geophysics, Abstracts, 1998 SEG International Exposition and Sixty-Eighth Annual Meeting, p. 8.

Kan, Tze-Kong, et al., Sep. 18, 1998, "3-D Geopressure Analysis in Deep Water GOM," Workshop: Deep Water Exploration & Production Geophysics, Abstracts, 1998 SEG International Exposition and Sixty-Eighth Annual Meeting, pp. 8-9.

Lee, Stan, et al., Sep. 18, 1998, "Deep Water Petroleum Exploration Using Seismic Pressure Methods," Workshop: Deep Water Exploration & Production Geophysics, Abstracts, 1998 SEG International Exposition and Sixty-Eighth Annual Meeting, p. 9.

Mallick, Subhashis, et al., Sep. 18, 1998, "Analysis of Bottom Simulating Reflector Data," Workshop: Deep Water Exploration & Production Geophysics, Abstracts, 1998 SEG International Exposition and Sixty-Eighth Annual Meeting, pp. 9-10.

Dutta, N.C., Sep. 18, 1998, "The Role of Seismic While Drilling Measurements for Shallow Water Flow Applications," Workshop: Deep Water Exploration & Production Geophysics, Abstracts, 1998 SEG International Exposition and Sixty-Eighth Annual Meeting, p. 10.

Sarmiento, Roberto, "Geological Factor Influencing Porosity Estimates From Velocity Logs," Bulletin of the American Association of Petroleum Geologists, vol. 45, No. 5, May 1961, pp. 633-644.

Pennebaker, Jr., E.S., "Seismic Data Indicate Depth, Magnitude of Abnormal Pressures," World Oil, Jun. 1968, pp. 73-77.

Zsellér, P., "Determination of Layer Pressures Using Interval Velocities," Geofizikai Kozlemenyek, vol. 25, 1979, pp. 39-51.

Bell, David W. and Shirley, Donald J., "Temperature Variation of the Acoustical Properties of Laboratory Sediments," J. Acoust. Soc. Am., vol. 68, No. 1, Jul. 1980, pp. 227-231.

Chave, Alan D. and Cox, Charles S., "Controlled Electromagnetic Sources For Measuring Electrical Conductivity Beneath the Oceans 1. Forward Problem and Model Study," Journal of Geophysical Research, vol. 87, No. B7, Jul. 10, 1982, pp. 5327-5338.

Dutta, N.C., "Shale Compaction and Abnormal Pore-Pressures: A Model of Geopressures in the Gulf Coast Basin," Society of Exploration Geophysicists, Expanded Abstracts With Biographies, 1983 Technical Program, 53rd Annual International SEG Meeting, Sep. 11-15, 1983, Las Vegas, Nevada, pp. 542-544.

Corbin, Robert J. et al., "Shear and Compressional-Wave Surface and Downhole Tests in Southern Louisiana," Abstract in AAPG Bulletin, vol. 68, No. 4, Apr. 1984, pp. 465-466.

Dutta, N.C., "Shale Compaction, Burial Diagenesis, and Geopressures: A Dynamic Model, Solution and Some Results," in Jean Burrus, ed., *Thermal Modeling In Sedimentary Basins*, 1st IFP Exploration Research Conference, Carcans, France, Jun. 3-7, 1985, Paris: Editions Technip, 1986, pp. 149-172.

Bell, David W., "Low Seismic Frequencies: Acquisition and Utilization of Broad-Band Signals Containing 2-8 Hz Reflection Energy," 1986 Annual Meeting Abstracts S8.1 in Geophysics, vol. 52, No. 3, Mar. 1987, pp. 421-422.

Onyia, E.C., "Geology Drilling Log - A Computer Database System For Drilling Simulation," SPE Drilling Engineering, vol. 2, No. 1, Mar. 1987, pp. 27-36.

Dutta, N.C., "Fluid Flow in Low Permeable, Porous Media," Revue de L'Institut Francais du Petrole, vol. 43, No. 2, Mar. - Apr. 1988, pp. 165-180.

Onyia, E.C., "Relationships Between Formation Strength, Drilling Strength, and Electric Log Properties," SPE 18166, 63rd Annual Technical Conference and Exhibition of the SPE, Houston, TX, Oct. 2-5, 1988, pp. 605-618.

Martinez, R.D. et al., "Formation Pressure Prediction With Seismic Data From the Gulf of Mexico," SPE Formation Evaluation, vol. 6, No. 1, Mar. 1991, pp. 27-32.

Keyser, W. et al., "Pore Pressure Prediction From Surface Seismic," World Oil, vol. 212, No. 9, Sep. 1991, pp. 115-124.

Dupal, K. and Flodberg, K.D., "Auger TLP: Drilling Engineering Overview," SPE 22543, 66th Annual Technical Conference and Exhibition of the Society of Petroleum Engineers, Dallas, TX, Oct. 6-9, 1991, pp. 85-100.

Onyia, E.C., "An Analysis of Experimental Data on Lost Circulation Problems While Drilling With Oil-Base Mud," SPE 22581, 66th Annual Technical Conference and Exhibition of the Society of Petroleum Engineers, Dallas, TX, Oct. 6-9, 1991, pp. 425-436.

Proehl, T.S. et al., "Assessing the Productivity Enhancement and Economic Impact of Geopressure Evaluation Computer Software," SPE 24447, Seventh Petroleum Computer Conference of the Society of Petroleum Engineers, Houston, TX, Jul. 19-22, 1992, pp. 231-239.

Advocate, D.M. and Hood, K.C., "An Empirical Time-Depth Model for Calculating Water Depth, Northwest Gulf of Mexico," Geo-Marine Letters, vol. 13, 1993, pp. 207-211.

Grauls, D. and Cassignol, C., "Identification of a Zone of Fluid Pressure-Induced Fractures From Log and Seismic Data - a Case History," First Break, vol. 11, No. 2, Feb. 1993, pp. 59-68.

Kan, T.K. and Sicking, C.J., "Pre-Drilled Geophysical Methods For Geopressure Detection and Evaluation," Chapter 6, Studies in Abnormal Pressures. Developments in Petroleum Science, 38, edited by W. H. Fertl et al., Elsevier Science, 1994, pp. 155-186.

Onyia, E.C., "Experimental Data Analysis of Lost-Circulation Problems During Drilling With Oil-Based Mud," SPE Drilling & Completion, vol. 9, No. 1, Mar. 1994, pp. 25-31.

Kader, Mohd Shariff Bin, "Abnormal Pressure Occurrence in the Malay and Penyu Basins, Offshore Peninsular Malaysia - A Regional Understanding," Geol. Soc. Malaysia, Bulletin 36, Dec. 1994, pp. 81-91.

Minear, John et al., "Compressional Slowness Measurements While Drilling," SPWLA 36th Annual Logging Symposium, Jun. 26-29, 1995, pp. 1-12.

Audet, D. Marc, "Compaction and Overpressuring in Pleistocene Sediments on the Louisiana Shelf, Gulf of Mexico," Marine and Petroleum Geology, vol. 13, No. 5, 1996, pp. 467-474.

Dutta, N.C. and Ray, A., "Subsurface Image of Geopressured Rocks Using Seismic Velocity and Acoustic Impedance Inversion," EAGE 58th Conference and Technical Exhibition - Amsterdam, The Netherlands, Jun. 3-7, 1996.

Dutta, N.C., "Pressure Prediction From Seismic Data: Implications For Seal Distribution and Hydrocarbon Exploration and Exploitation in the Deepwater Gulf of Mexico," In A.G. Koestler and P. Moller-Pederson, eds., Hydrocarbon Seals: Importance for Exploration and Production (Norwegian Petroleum Society Special Publication No. 7), Amsterdam: Elsevier, 1997, pp. 187-199.

Leising, L.J. et al., "Extending the Reach of Coiled Tubing Drilling (Thrusters, Equalizers and Tractors)," SPE/IADC 37656, SPE/IADC Drilling Conference, Amsterdam, The Netherlands, Mar. 4-6, 1997, pp. 677-690.

Gurney, Judith, "Migration or Replenishment in the Gulf," Petroleum Review, May 1997, pp. 200-203.

"Extending Coiled-Tubing-Drilling Reach," JPT, vol. 49, No. 6, Jun. 1997, pp. 597-598.

Dunsmuir, John H. et al., "Synchrotron Microtomography: System Design and Application to Fluids in Small Channels," Reprinted from Developments in X-Ray Tomography, SPIE, vol. 3149, San Diego, California, Jul. 28-29, 1997, pp. 82-89.

Stewart, Lisa and Dodds, Kevin, "Drill Bit Seismic," Journal of Offshore Technology, vol. 5, No. 3, pp. 36-39, Aug. 1997.

Traugott, Martin, "Pore/Fracture Pressure Determinations in Deep Water," Deepwater Technology, Aug. 1997, pp. 68-70.

Hsu, Kai et al., "Sonic-While-Drilling Tool Detects Overpressured Formations," Oil & Gas Journal, Aug. 4, 1997, pp. 59-67.

Eaton, Dr. Ben A. and Eaton, Travis L., "Fracture Gradient Prediction for the New Generation," World Oil, Oct. 1997, pp. 93-100.

"Geopressure Estimation Software," published by Petrospec Computer Corporation, Richardson, TX, 1998.

Greenberg, Jerry, "Managing Loss-of-Control in Deepwater Drilling," Reprinted from Apr. 1998 edition of Offshore.

Paulsson, B.N.P. et al., "Advanced Borehole Seismology," OTC 8819, Offshore Technology Conference, Houston, Texas, 4-7, May 1998, pp. 489-498.

Meehan, Richard et al., "Case Histories Show Real-Time Information Reduces Uncertainty," Oil & Gas Journal, May 18, 1998, pp. 54-59.

Lee, Stan et al., "Illuminating the Shadows: Tomography, Attenuation, and Pore-Pressure Processing in the South Caspian Sea," The Leading Edge, Jun. 1998, pp. 777-782.

Wilhelm, R. et al., "Seismic Pressure-Prediction Method Solves Problem Common in Deepwater Gulf of Mexico," Oil & Gas Journal, Sep. 14, 1998, pp. 67-75.

Eaton, Dr. Ben A., "Using Pre-Drill Seismic and LWD Data for Safe, Efficient Drilling," World Oil, Dec. 1998, pp. 51-57.

Kenda, William P. et al., "Real-Time Geo-Pressure Analysis Reduces Drilling Costs," Oil & Gas Journal, Mar. 1, 1999, pp. 52-59.

Kan, Tze-Kong et al., "3-D Geopressure Analysis in the Deepwater Gulf of Mexico," The Leading Edge, Apr. 1999, pp. 502-521.

Varsamis, G.L. et al., "A New MWD Full Wave Dual Mode Sonic Tool Design and Case Histories," SPWLA 40th Annual Logging Symposium, Oslo, May 30 - Jun. 3, 1999, Paper F.

Project Summary, DEA-132, "Use of Converted Shear Wave Data to Identify Shallow Water Hazards Prior To Drilling," including New Proposal Summary, DEA-132, "Feasibility of Pre-drill Detection of Sands Likely to Exhibit Shallow Water Flows," Aug. 2, 1999, Drilling Engineering Association, Houston, Texas.

Castagna, John P. et al., "Feasibility of Pre-Drill Detection of Sands Likely to Exhibit Shallow Water Flows Using Multi-Component Seimsic Data: Proposal for a Joint Industry Project," presented at Marathon Oil, Houston, Texas, Aug. 19, 1999.

Xu, Shiyu and Keys, Bob, "Study of the Coupled Effect of Pressure, Frequency and Fluid Content on P- and S-Wave Velocities," Technical Program: Expanded Abstracts, 69th Annual Meeting of the Society of Exploration Geophysicists, Houston, TX, Oct. 31-Nov. 5, 1999.

Davalath, Janardhan, "Subsea Separation Shortens Cycle for Deepwater, Long Offset Production," Offshore, Dec. 1999, pp. 66-70 & 112.

Kuyken, C.W. and de Lange, Frank, "Pore Pressure Predicition Allows for Tighter Pressure Gradient Control," Offshore, Dec. 1999, pp. 64-65 & 112.

Dvorkin, Jack, "Pore Pressure and Fluid Detection From Compressional- and Shear- Wave Data," Standford Rock Physics and Borehole Geophysics Report, vol. 73, 2000, pp. 1-12.

Bradford, I.D.R. et al., "When Rock Mechanics Met Drilling: Effective Implementation of Real-Time Wellbore Stability Control," IADC/SPE 59121 Drilling Conference, New Orleans, Louisiana, Feb. 23-25, 2000, pp. 1-13.

Sayers, C.M. et al., "Predrill Pore Pressure Prediction Using Seismic Data," IADC/SPE 59122 Drilling Conference, New Orleans, Louisiana, Feb. 23-25, 2000, pp. 1-7.

Dutta, N.C., "A Retrospective on the Wave Propagation in Porous Media - Seismic Links," Workshop on Seismic Signatures of Fluid Transport, Berlin, Germany, Feb. 27-29, 2000 (Abstract).

Rasolofosaon, P.N.J. and Zinszner, B.E., "Dynamic Poroelasticity in Anisotropic Rocks - Experimental Observations Versus Theoretical Predictions," Workshop on Seismic Signatures of Fluid Transport, Berlin, Germany, Feb. 27-29, 2000 (Abstract).

Wulff, A.-M. et al., "Seismic Monitoring of Fluid Fronts: An Experimental Study," Workshop on Seismic Signatures of Fluid Transport, Berlin, Germany, Feb. 27-29, 2000 (Abstract).

Xu, S., "Modeling Elastic Wave Propagation in Porous Media Using an Inclusion-Based Model," Workshop on Seismic Signatures of Fluid Transport, Berlin, Germany, Feb. 27-29, 2000 (Abstract).

Dutta, N.C., "Unconventional Use of Conventional Seismic: Extraction of Subsurface Pressure Information From Seismic Data," abstract of paper to be presented at Data Processing SIG Meeting, Sponsored by Geophysical Society of Houston, Houston, TX, Apr. 19, 2000, Geophysical Society of Houston Newsletter, vol. 34, No. 7, 2000, pp. 4-5.

Carcione, J.M., "Amplitude Variations With Offset of Pressure-Seal Reflections," Geophysics, vol. 66, No. 1, Jan. - Feb. 2001, pp. 283-293.

Predictions, vol. 1, Issue 1, 1st Quarter 2001, Published by Knowledge Systems, Inc., Stafford, TX.

Prediction, vol. 1, Issue 2, 2nd Quarter 2001, Published by Knowledge Systems, Inc., Stafford, TX.

Predictions, vol. 1, Issue 3, 3rd Quarter 2001, published by Knowledge Systems, Inc., Stafford, TX.

Underhill, W., et al., "Demonstrations of Real-Time Borehole Seismic Froman LWD Tool" SPE 71365 Annual Technical Conference and Exhibition, New Orleans, Louisiana, Sep. 30 - Oct. 3, 2001, pp. 1-5.

Predictions, vol. 1, Issue 4, 4th Quarter 2001, published by Knowledge Systems, Inc., Stafford, TX.

Bell, David W., "Velocity Estimation for Pore-Pressure Prediction," in A. R. Huffman and G. L. Bowers, eds., Pressure Regimes in Sedimentary Basins and Their Prediction: AAPG Memoir 76, 2002, pp. 177-215.

Borge, Hans, "Modelling Generation and Dissipation of Overpressure in Sedimentary Basins: An Example from the Halten Terrace, Offshore Norway," Marine and Petroleum Geology 19, 2002, pp. 377-388.

Huffman, Alan R., "The Future of Pressure Prediction Using Geophysical Methods," in A.R. Huffman and G.L. Bowers, eds., Pressure Regimes in Sedimentary Basins and Their Prediction: AAPG Memoir 76, 2002, pp. 217-233.

Predictions, vol. 1, Issue 1, 1st Quarter 2002, published by Knowledge Systems, Inc., Stafford, TX.

Predictions, vol. 2, Issue 2, nd Quarter 2002, published by Knowledge Systems, Inc., Stafford, TX.

Mallick, S. and Dutta, N.C., "Shallow Water Flow Prediction Using Prestack Waveform Inversion of Conventional 3D Seismic Data and Rock Modeling," The Leading Edge, vol. 21, No. 7, Jul. 2002, pp. 675-680.

Ashida, Y. and Kawamura, T., "The Application of Synthetic Acoustic Impedance Log to the Computation of Formation Pore Pressure Gradient and Fracture Gradient," Geophysical Exploration, vol. 35, No. 1, pp. 13-21, 1982. ( An English language translation is attached.).

* cited by examiner

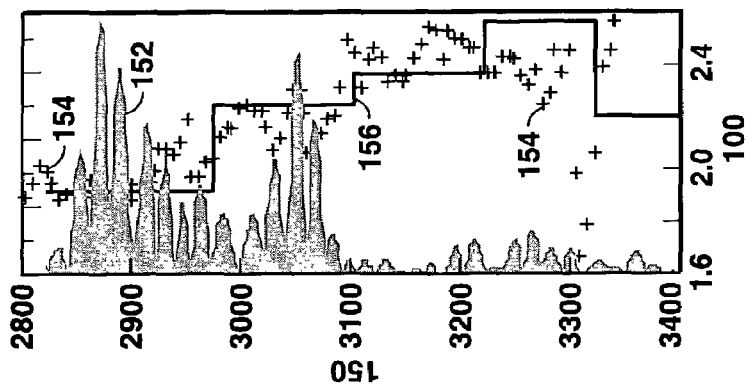
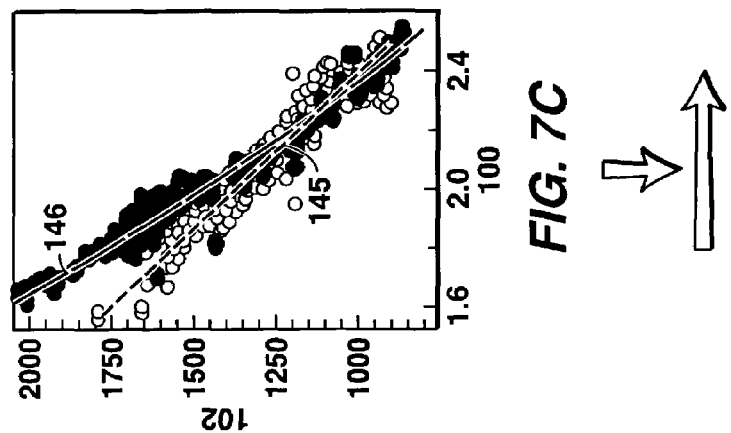
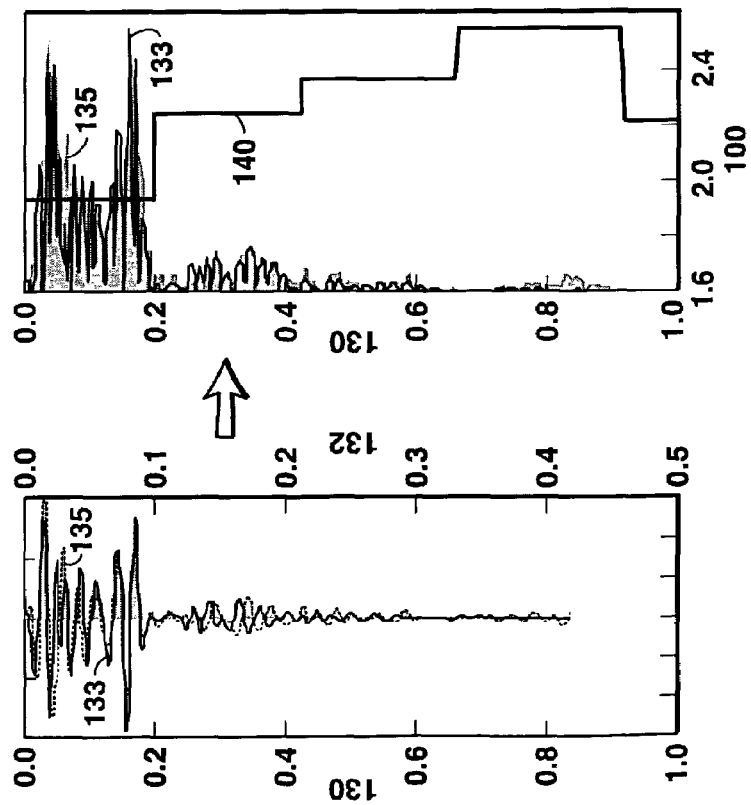
FIG. 7D
FIG. 7C
FIG. 7B
FIG. 7A

METHOD FOR BOREHOLE MEASUREMENT OF FORMATION PROPERTIES

This application is a continuation-in-part of U.S. application Ser. No. 09/686,735 filed Oct. 10, 2000, now abandoned, and of co-pending U.S. application Ser. No. 09/973,529 filed Oct. 9, 2001 now abandoned.

FIELD OF THE INVENTION

The present invention is a method of estimating a formation's properties, more specifically pore pressure, using a bottom hole assembly which has not yet penetrated the formation.

BACKGROUND OF THE INVENTION

The pore-fluid pressure of a rock formation, which is also referred to as simply the pore pressure, is measured relative to normal pressure at the depth of the formation, in other words relative to the hydrostatic pressure of a column of water at that depth. During the drilling of a petroleum well, accurate knowledge of formation pore pressure is necessary to ensure that formation fluids do not flow into the wellbore, which can potentially cause well blow-outs. A drilling fluid, usually referred to as drilling mud or simply mud, with desired weight and rheological properties is maintained in the wellbore as the primary method for controlling formation fluid flow. A problem with the use of drilling mud, however, is that if the pressure in the wellbore resulting from the mud's weight is too high, relative to the pore pressure, the drilling rate may be decreased unnecessarily. In addition, if the pressure resulting from the mud's weight is excessively high compared to the pore pressure, that pressure may exceed the formation fraction pressure, potentially causing a loss of mud into the formation, and/or a well control problem. It is preferable therefore if the muds used in drilling wells result in an optimum range of wellbore pressure, relative to pore pressure, such that wells may be drilled safely but expediently. This is often difficult, unfortunately, because accurate pre-drill knowledge of pore pressures is not always available, especially in areas with few previously drilled wells or where the geology is complex.

More specifically, drilling operations at present generally attempt to ensure that the wellbore pressure at any given depth is about 0.5 pounds per gallon (0.5 ppg) greater than the highest estimated pore pressure at that depth. This 0.5 ppg wellbore pressure safety margin is in part required due to industry's present inability to accurately predict pore pressures in the various formations through which the drilling assembly will drill. Reducing the uncertainty in knowing the pore pressure ahead of the bit would lead to significant reductions in the cost of drilling operations, as a result, for example, of an improved ability to specify casing setting depths and of an increase in the rate at which wells are drilled. The present invention allows continuous estimation of pore pressures of formations ahead of the drilling assembly, and thereby allows drilling operations to be carried out with lower average mudweights—in other words with mud weights which are optimized for the formations to be drilled and thereby do not require use of as large a pressure margin as is current practice.

Data presently used to estimate the pore pressure profile versus depth at proposed well locations include offset well data, surface seismic data, seismic-while-drilling data, and geologic models. Pressure measurements from nearby offset wells can provide the most accurate pre-drill pressure information, but for remote locations these data are generally not available. Pore pressure estimation from surface seismic data is based on an empirical relationship between the velocity of sound waves in the formation and pore pressure, with assumptions made for the nature of the formation, in other words the type of rocks that are expected to be present (which is also referred to as formation lithology). This relationship is based on a number of different properties which are understood in industry. For example, formation velocity estimation from seismic data using normal moveout analysis techniques is well understood in the art. Equally well understood is the fact that formation velocity is a function of both the elastic moduli and the density of the rock, and that formation velocity generally increases with depth as rocks become more and more compacted. It is also understood that an increase in pore pressure with depth often coincides with a decrease in this increasing velocity trend (or even an actual decrease in velocity with depth) because the higher pore pressure is associated with less compacted rock. These combined factors allow derivation of empirical velocity-pore pressure relationships for use with seismic data.

Pore pressure predictions from seismic data analysis typically suffer from large uncertainty however. There are several contributing factors to this uncertainty, including the inherent uncertainty in the velocity models, the uncertainties in the variation of lithology compared with the data used to build the velocity-pore pressure empirical relationships, and the low vertical resolution of the seismic data. In addition, large and significant pore pressure variation can occur over vertical intervals of rock much thinner than that which seismic data can resolve.

Seismic-while-drilling (SWD) is a method for estimating formation velocity above and below the drill-bit during the drilling process. Geophones and/or hydrophones placed at the earth's surface around the well being drilled record the seismic signals produced by the drill-bit as it drills into the formation. Although the drill bit may emit frequencies across the acoustic band up to or above approximately 20 kiloHertz (20 kHz), only the frequencies in the seismic band (which will be understood to those skilled in the art as less than about 100 Hz., and more specifically less than about 80 Hz.) propagate to the surface. In addition to the seismic band signals, an acoustic signal from the drill bit also propagates along the drill string assembly to the surface. The signal to be used to determine formation velocity is detected by cross correlating the signal propagating through the earth with the signal that has propagated along the drill string. See for example the disclosure of Staron, Arens, and Gros, in U.S. Pat. No. 4,718,048 titled "Method of Instantaneous Acoustic Logging Within a Wellbore." That signal is usually at a single frequency, typically about 50 Hz, and, using inversion processing, which is analogous to surface seismic processing, can be used to estimate the acoustic impedance and velocity of intervals below the drill bit. Pore pressure is then estimated using the same velocity-pore pressure empirical relationships used with surface seismic data.

Compared to pore pressure prediction using surface seismic methods, the main advantages of SWD are that the depth to sub-surface reflectors is better constrained and vertical resolution is improved. Unfortunately, there are also some important limitations with SWD. For example, the resolution of analytic results from SWD data is generally limited by the relatively low seismic wave frequencies. Second, poor SWD signals are received with polycrystalline diamond compact (PDC) bits, which are generally the preferred bits for drilling operations where high pore pressure is expected to be encountered. Traditional roller-cone bits provide the best SWD signals but may compromise efficient drilling operations in many areas. Third, drilling with downhole motors that rotate the bottomhole assembly while leaving the rest of the drillpipe non-rotating has become a preferred method in many areas, but that method also provides poor SWD signals. One method proposed to improve SWD in these situations, such as disclosed by Barr et. al. in U.S. Pat. No. 4,873,675 titled "Method and Apparatus for Seismic Exploration of Strata Surrounding a Borehole," uses drilling jars, which are apparatus made to violently move the bottomhole assembly up or down on demand to free stuck pipe, as the acoustic source rather than the drill bit. The drilling jar method involves downhole detection of the reflected signal with a downhole geophone run on a cable with a side-door entry sub. Unfortunately, Barr's method is not feasible in most situations because of the need for the cable, which is disruptive to the drilling operation. Another method, disclosed by Beresford and Crowther in U.S. Pat. No. 5,798,488 titled "Acoustic Sensor," uses a downhole acoustic transducer to both send and receive the acoustic signal. Beresford and Crowther do not disclose a method for determining formation properties however.

Seismic data is also used to guide the drilling process, for example to aid identification of potential high-pressure zones. However, seismic signal velocities are poorly correlated with high-pressure zones, and seismic data resolution is far below that needed to make decisions during drilling. Increased seismic data resolution can be achieved by employing Vertical Seismic Profiling (VSP). In VSP, geophones are lowered into the borehole so that the precise depth of the geophone is known and only the one way seismic travel times need to be measured. A major disadvantage of VSP, however, is that the drill string must be removed for VSP measurements. VSP data is therefore by necessity only taken over limited intervals.

A method and apparatus is desired which will facilitate accurate estimation of the pore pressure in rock formations before such formations have been penetrated by a drilling assembly. Preferably, this method and apparatus should not require withdrawal of the entire drill string from the borehole each time measurement data is to be acquired, and should preferably allow generally continuous, if so desired, estimation of pore pressures in the formations directly ahead of the drilling assembly. The present invention addresses these objectives.

SUMMARY OF THE INVENTION

The present invention involves use of a bottom hole assembly deployed in a borehole to estimate formation properties. In the invention a source signal is emitted from the bottom hole assembly and at least one signal is received by one or more receivers in the bottom hole assembly. Analysis of the frequency dependent characteristics of the received signal allows the estimation of the formation properties of interest.

BRIEF DESCRIPTION OF THE DRAWINGS

The features of the present invention will become more apparent from the following description in which reference is made to the drawings appended hereto. Reference numbers that are used in more than one of the drawings refer to the same function in each drawing.

FIG. 7 shows an example of the steps of the time interval phase matching procedure of an embodiment of the present invention to determine velocity ratio as a function of depth.

Figure 1:
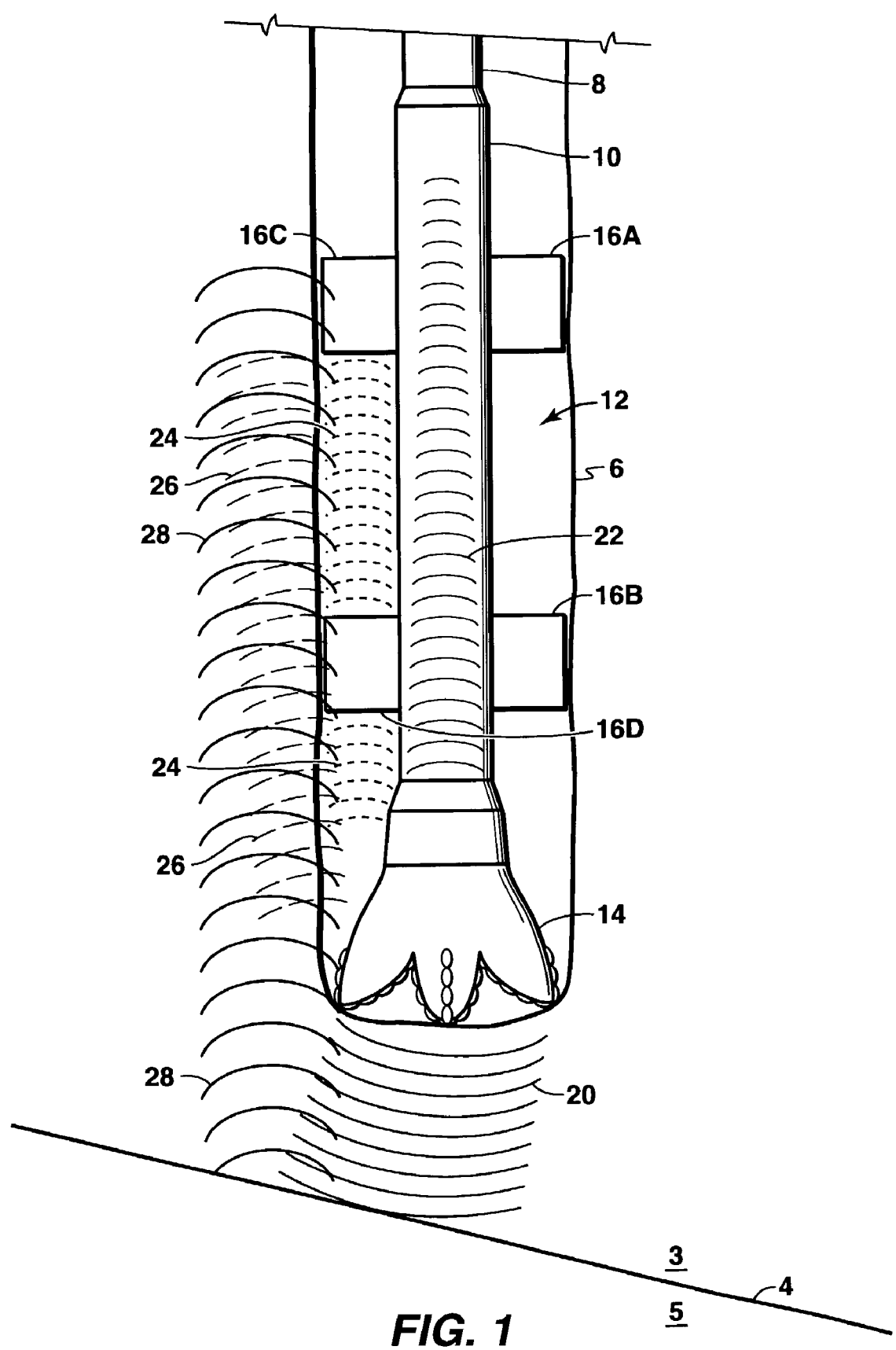
FIG. 1 shows a schematic diagram of a bottom hole assembly in a borehole and the signals that may be generated and detected according to embodiments of the present invention.

Changes and modifications in the specifically described embodiments can be carried out without departing from the scope of the invention, which is intended to be limited only by the scope of the appended claims.

DESCRIPTION OF THE INVENTION

The present invention is a system and method to estimate formation properties and in particular to estimate pore pressure in the vicinity of or in the formation ahead of the drill bit by analyzing acoustic waves that are emitted from the bottom hole assembly (BHA) and which pass through and are reflected from the formation. The acoustic waves used in the present invention are in the frequency range up to about 20 kHz and can be generated passively, such as by the drill bit in the drilling process, or actively, by placing a controlled acoustic signal source in the BHA. When active frequency sources are used, a much wider range of frequencies may be employed, up to or greater than 100 kHz. In the present invention acoustic detectors are mounted along the BHA to detect both compressional and shear waves. The pore pressure estimate for the formation ahead of the drill bit can be derived from the analysis of the frequency dependence of both the compressional wave amplitudes in the reflected signals and the change in velocities of the received signals. In addition, pore pressure may be estimated from the change in the ratio of the compressional to the shear wave velocities in the received signals. Other formation property estimates may also be derived from the analysis of the acoustic waves, such as fluid properties and permeability.

For implementation in a measurement while drilling system, the present invention is a bottom hole assembly (BHA) which includes a source for generating the acoustic waves, a receiver array mounted on the BHA for detecting the acoustic wave signals, a means for processing the signals received by the receivers in a manner which allows estimation of pore pressure information, and a means for transmitting said pore pressure information to the drilling rig on the surface. In an alternate embodiment of the present invention, the received signals may be transmitted to the surface, where the processing to estimate pore pressure may be carried out.

The source of the acoustic signals may be the drill bit itself (in other words a passive source) or an active source mounted on the BHA.

For implementation in a measurement during well logging system, the present invention is a logging tool which includes a source for generating acoustic waves, a receiver array mounted on the logging tool for detecting the acoustic signals, a means for transmitting the detected signals to the surface control station, and a means for processing the detected signals at the surface to estimate the pore pressure. Alternatively, the logging tool may be designed for processing the acoustic signals on board the logging tool, with the processed data, which includes but is not limited to the pore pressure, then transmitted to the surface.

For convenience in reference herein but not to be limiting, the term bottom hole assembly (BHA) will be used to refer to the downhole apparatus of the present invention, whether the implementation of the present invention is a measurement while drilling or a measurement while well logging system.

The present invention also includes a method to estimate the pore pressure in the vicinity of the BHA. The method includes the steps of detecting actively or passively generated acoustic signals of varying frequencies, directly and after they are reflected from formations in the vicinity of the BHA, determining frequency dependent properties, such as attenuation or velocity, of the detected signals, and estimating the pore pressure of formations in the vicinity of and ahead of the BHA. If so desired, other properties of formations in the vicinity of and ahead of the BHA may also be estimated.

A first embodiment of the present invention is depicted in FIG. 1. The measurement system of this embodiment includes a source for generating acoustic signals at or near the drill bit; a receiver array mounted on the BHA for detecting the signals generated by the source; hardware and software for signal processing, and a telemetry system for transmitting data to the drill rig.

The source for generating acoustic signals may be either passive or active. A passive source system will rely on the noise spectrum of the drill bit, which will typically involve large amplitude signals at frequencies up to about 20 kHz, to generate the source signal. The drill bit noise spectrum will generally have its highest amplitudes in the frequency of about 4 to about 6 kHz, and those amplitudes are typically far larger than the amplitudes of signals in the 10 to 100 Hz range which can be detected at the surface using seismic while drilling measurement techniques. The present invention teaches how to use these higher amplitude signals to image the formation rocks ahead of the drill bit through the use of suitable signal detectors, also referred to as receivers, and signal processing components. More specifically, one embodiment of the present invention involves the recording of the portion of the noise signal which is generated by and propagates ahead of the drill bit and reflects back to the BHA, and, using the correlation methods described further below, allows the estimation of the characteristics of the formation ahead of the bit.

An active source mounted in the BHA may also be used in the present invention. One advantage of using an active source is that data processing will generally be simplified. A second advantage is that the energy from the active source may be directed in specific directions ahead of the bit to increase the signal strength from the desired reflectors. A variety of signal generation and data analysis options are possible for active source embodiments of the present invention. One option is to generate continuous signals with frequencies swept repetitively over a desired frequency range for a specified time period. Alternatively, a discrete set of frequencies over the desired frequency range can be generated. A pulsed excitation source may also be used where the pulse width and amplitude are chosen so that the Fourier components of the frequencies in the source signal span a desired frequency range. When using an active source, either continuous wave or pulsed, the source can be triggered during a hiatus in drilling, which further simplifies data processing by eliminating the drill bit noise spectrum from the detected signals. Finally, if so desired, active sources frequencies up to or greater than 100 kHz may be acquired if so desired.

Whether a passive or an active source is used in the present invention, bed boundaries, heterogeneities and other rock properties cause changes in acoustic impedance which reflect some of the source signal energy back to the BHA and which the receivers will detect. The depth of penetration of the source signals from the source to the reflectors will vary from several tens of feet when operating in a relatively high frequency range, from about 5000 Hz. and above, to several hundreds of feet when operating in a relatively low frequency range, from about 50 Hz. to 5000 Hz. If the drill bit noise spectrum is used as the source, the measured spectrum can be directly cross-correlated with the reflected signal to determine the time origin and the distance to the reflector. If an active source is used, techniques similar to those used in reflection seismology or ground-penetrating radar can be used to determine the distance to the reflectors.

The receivers must be mounted on the BHA since the signal frequencies preferably to be used in the present method will not propagate to the surface with measurable amplitudes. Receivers used in the present method must be capable of measuring frequencies in the range generated by the source. For a passive source system in which the drill bit noise spectrum is the signal, the receivers should preferably be able to measure signals up to about 20 kHz. If an active source is used, the receivers must be chosen to be able to measure the signal frequencies that the source will generate. Preferably, receivers used in the present method should be capable of measuring both compressional waves and shear waves. Note also that transducers which are capable of both generating and receiving acoustic signals may be used in the present invention.

In the embodiment of FIG. 1, several different signals will be detected by the receivers. Bottom hole assembly 12, which extends into borehole 6, is deployed, in a measurement while drilling system embodiment, on the end of drill string 8. Note that the embodiment of bottom hole assembly 12 in FIG. 1 is schematic in nature only and is not intended to be limiting. Bottom hole assembly 12 comprises a center member 10, receivers 16, and, if data processing is performed downhole, will also include data processing components (not depicted in FIG. 1). Bottom hole assembly 12 as referred to herein means all components of the downhole apparatus below drill string 8 but above drill bit 14. Source signal 20 is emitted from a passive source, such as drill bit 14, or an active source (not depicted) in bottom hole assembly 12, and propagates through first formation 3 to reflector 4, which is the boundary between first formation 3 and second formation 5. Receivers 16A, 16B, 16C, and 16D may detect a number of different types of signals; FIG. 1 depicts examples of four of those types of signals. These signals, which will be discussed further below, will be generally referred to as receiver signals for convenience but not to be limiting. Note also that, in the following discussion the term signal will refer generally to the wavefronts of the signals depicted in FIG. 1 and further discussed below. However FIG. 1 does not differentiate between the compressional wave signal and the shear wave signal. It will be understood to those skilled in the art that both compressional and shear waves have the same direction of propagation, for example as depicted in FIG. 1, but have different directions of particle motion within the wavefront. It will be understood that in a preferred embodiment of the present invention receivers 16 can sense both compressional and shear waves signals. It will be understood that the present invention is not limited to a bottom hole assembly which has four receivers 16, but that the four receivers 16 in FIG. 1 are depicted for convenience in the description of the present invention.

A first receiver signal which will be detected is the direct arrival signal 22, which travels to receivers 16 along central member 10 of bottom hole assembly 12. If source signal 20 is derived from a passive source, such as drill bit 14, the measurement of direct arrival signal 22 from drill bit 14 to receivers 16 serves to establish the time origin of source signal 20 which is required for the cross-correlation analysis to be discussed below. This time origin determination is made possible from calibration of the frequency dependent travel time along the central member 10 and the known distance from the passive source to the receivers. To most accurately measure direct arrival 22, one of the receivers 16, for example receiver 16A, should preferably be isolated from source signal 20 and the other signals to be discussed further below. Isolating one of the receivers 16 from the rest of the other signals is a hardware implementation issue that will be understood to those skilled in the art.

In a measurement while well logging implementation of the present invention, an active source will be used and the time origin of the source signal will be known from the time at which the source is activated to generate a source signal. Therefore, it will generally be unnecessary to include an isolated receiver 16 in a measurement while well logging implementation of the present invention.

A second receiver signal detected by receivers 16 is known as the tube wave, or Stoneley wave, and is shown as direct borehole signal 24 in FIG. 1. For clarity, direct borehole signal 24 is depicted with short dashed lines in FIG. 1. Direct borehole signal 24 propagates from the source within borehole 6 to receivers 16. Direct borehole signal 24 can be used to estimate formation petrophysical properties, as is well known in the art. More specifically, it will be understood that permeability of the formation surrounding the borehole (first formation 3 in FIG. 1 extends upward from boundary 4 and surrounds borehole 6) is a property which can be estimated from analysis of direct borehole signal 24.

A third receiver signal which is detected by receivers 16 is direct formation signal 26 in FIG. 1, which travels directly from the source to receivers 16 through the portion of first formation 3 surrounding borehole 6. For clarity, direct formation signal 26 is depicted with long dashed lines in FIG. 1. As will understood in the art, direct borehole signal 26 may be identified by linear move out analysis of the data recorded by receivers 16, and may be used to determine the frequency dependent velocity of first formation 3. The frequency dependent velocity may be used to determine the distance in first formation 3 from the source, drill bit 14 in FIG. 1, to reflector 4. Direct formation signal 26 may also be used to estimate petrophysical properties of first formation 3 according to embodiments of the method of the present invention further described below.

A fourth receiver signal which is detected by receivers 16 is reflected signal 28, which is reflected from boundary 4 back towards bottom hole assembly 12. Reflected signal 28 is a signal from which changes in formation properties in the region ahead of bottom hole assembly 12 may be determined. Because receivers 16 are positioned at varying distances from the source, the establishment of the arrival time of reflected signal 28 at each receiver allows the distance from source 14 to boundary 4 to be determined using normal moveout methods. As will be understood those skilled in the art, normal moveout methods are also used in surface seismic surveys. Reflected signal 28 will be identified by hyperbolic move out, and will provide the frequency dependent information from which embodiments of the method of the present invention allow the estimation of the pore pressure in second formation 5.

When a passive source, such as drill bit 14, is used to generate source signal 20, a cross-correlation analysis is used to identify the arrival times for all signals arriving at receivers 16. This process will be well understood to those skilled in the art. First, a window in time is used to record the amplitude versus time characteristics of the source noise spectrum that is present in direct arrival signal 22. The length of the time window is selected such that a truncated times series representing source signal 20 is available which is independent of the other signals arriving at the receivers, and must be chosen to be of sufficient width such that the desired frequency components of source signal 20 can be identified. Those frequency components will be identified in a Fourier transform of the truncated time series. The arrival times for the other signals recorded by the receivers, in other words for direct borehole signal 24, direct formation signal 26, and reflected signal 28, are identified by individually cross-correlating each such signal with the source signal 20 which is determined from this time window.

As will be understood to those skilled in the art, this cross-correlation involves the sliding of the time windowed source signal to later time intervals which correspond to later arrival times and convolving the source signal with the signals in these later intervals. This frequency dependent cross correlation can be achieved by using a notch filter and back transforming the Fourier transformed source signal. Different notches can be used to selectively determine the amplitudes for the desired frequency components.

When active sources are used, a frequency component analysis, such as a Fourier analysis or wavelet analysis, can be performed on the received signals to determine the frequency dependent velocity or attenuation. This simplification results from the known characteristics of the active source signal. Such analyses are well understood to those skilled in the art.

Figure 2:
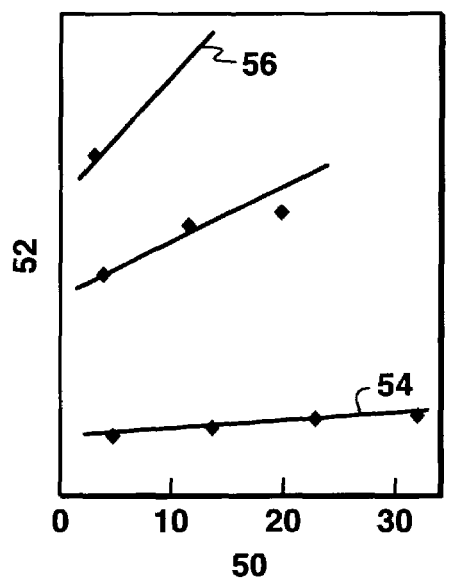
FIG. 2 shows a schematic diagram of the relationship between pore pressure, signal attenuation, and signal frequency.

One embodiment of a method of the present invention which allows estimation of the pore pressure of second formation 5 at boundary 4 is from analysis of the frequency dependent amplitudes in reflected signal 28. FIG. 2 depicts a representation of the relationship between pore pressure (which is abbreviated $P_p$ in FIG. 1; low pore pressure is represented by 54, high pore pressure is represented by 56), signal attenuation 52, and signal frequency 50 and is a simplification of detailed data in the published literature. In particular, the data in the literature generally uses a horizontal axis which is the logarithm of the product of frequency and viscosity. FIG. 2 is simplified for convenience, but not to be limiting. See for example O'Hara, Stephen G., 1985, "Influence of Pressure, Temperature, and Pore Fluid on the Frequency-Dependent Attenuation of Elastic Waves in Berea Sandstone," Physical Review A, Vol. 32, No. 1, pp. 472–488, and O'Hara, Stephen, G., 1989, "Elastic-Wave Attenuation in Fluid-Saturated Berea Sandstone," Geophysics, Vol. 54, No. 6, pp. 785–788. Note that the attenuation 52 of the amplitude of an acoustic signal (the vertical axis in FIG. 2) is essentially independent of frequency 50 at low pore pressure 54, whereas attenuation 52 increases with increasing frequency 50 at high pore pressure 56. (Although the simplified depiction in FIG. 2 does not show units for attenuation 52, it will be understood that acoustic signal attenuation is typically computed as the logarithmic decrement of a signal.) Thus, an analysis of the frequency dependence of the attenuation of the amplitudes of the signals received according to the present invention will reveal changes in formation pore pressure ahead of the bottom hole assembly.

The waveform processing to facilitate this analysis, including cross correlation, data inversion to convert travel time to distance, and frequency component analysis, may be performed either downhole, by microprocessors or discrete logic components mounted in bottom hole assembly 12, or at the surface facility. If the processing is performed downhole, the final pore pressure results are transmitted to the surface drilling rig by, for example, mud telemetry or other communication methods. If the processing is performed at the surface facility, the various measured signals are transmitted to the surface for analysis.

Figure 3:
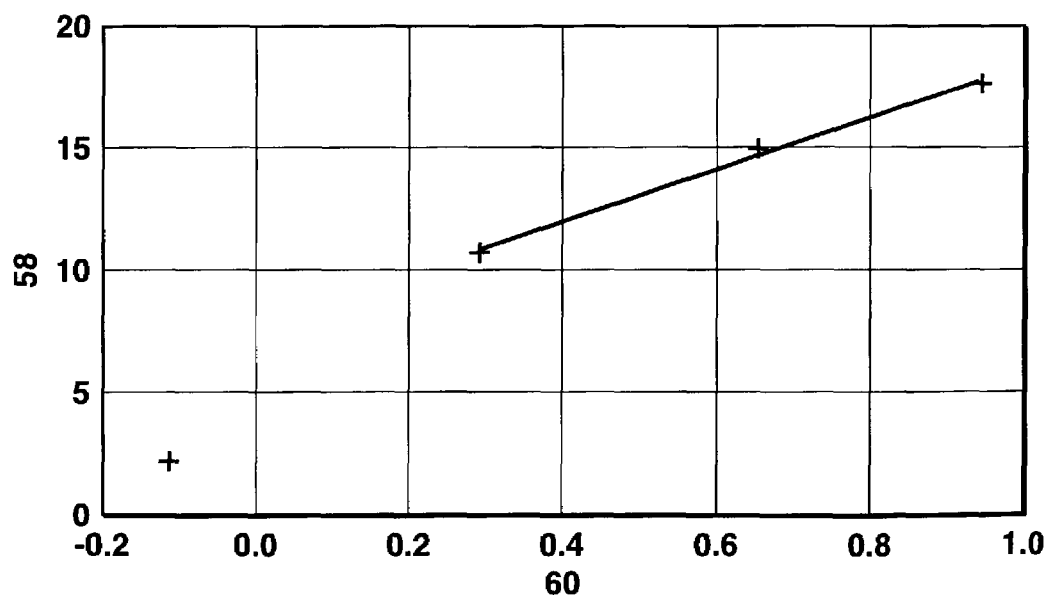
FIG. 3 shows a form of the relationship between pore pressure, signal attenuation, and signal frequency from which a direct estimate of formation pore pressure can be made according to the method of the present invention.

The results from which the simplification of FIG. 2 was derived can be further simplified as indicated in FIG. 3. In FIG. 3, a linear relationship is shown to exist between pore pressure 58, depicted on the vertical axis and measured in units of ppg (pounds per gallon), and the log of the slope of the lines derived by O'Hara in the data from which FIG. 2 was derived, depicted on the horizontal axis and represented by 60. Note that in the region of formation pore pressures 58 of interest to most drilling operations, 10 ppg to 20 ppg, the relationship is linear.

In this embodiment of the method of the present invention, the estimation of pore pressure follows directly from the data that is presented in simplified format in FIG. 2, and the data in FIG. 3. For estimating the pore pressure of a second formation 5 generally ahead of the BHA, a series of reflected signals 28 are recorded. These reflected signals 28 are analyzed to determine amplitude attenuation as a function of frequency. Next, unless measurement or other data provides a specific viscosity value for use in the present embodiment, a fluid formation viscosity value is assumed. For formations in which gas may be present, a conservative assumption of gas viscosity may be used. For formations in which shales are anticipated to be present, the viscosity of water may be assumed, since, as will be understood to those skilled in the art, shale formations are generally water saturated. The basis for conservative assumptions of viscosity of fluids in other formations can be determined by those skilled in the art. Next, a data curve for the subject formation is plotted which has the measured frequency dependent amplitude attenuation values plotted (vertical axis) as a function of the logarithm of the product of frequency and viscosity (horizontal axis). This data curve will reproduce for the subject data the plots of O'Hara referenced above, and simplified in FIG. 2. Next, the logarithm of the slope of this data curve is computed, and the data of FIG. 3 is used to estimate the pore pressure 58 for the subject formation.

For reference, a three point linear regression fit of the data in FIG. 3 above 10 ppg can be used to estimate pore pressure 58 according to the present embodiment. The data fit gives the following result:

Pore Pressure (ppg)=7.61+10.73*Log(Slope)

where Log(Slope) is the logarithm of the slope of the data curve of the subject formation. It will be understood in the art that the confidence level associated with the pore pressure 58 which is determined from FIG. 3 will be a function of the signal-to-noise ratio of the measured signals, and that by increasing the number of signal measurements which are used to determine the data curve both the signal-to-noise ratio and the pore pressure confidence level will be improved. It will also be understood that the O'Hara data, which is presented in simplified format in FIG. 2, from which FIG. 3 was derived relates to measurements made in Berea sandstone. The calculations of pore pressure according to the present embodiment preferably will be based on data that corresponds to the nature of the rock in the formation in which the bottom hole assembly is deployed. Analogous data for other formation types can be obtained by persons skilled in the art from the published literature or from laboratory measurements.

A second embodiment of the method of the present invention allows estimation of pore pressure from the frequency-dependent change in velocity of the signals that propagate back to bottom hole assembly 12. Several mechanisms have been proposed to account for the frequency dependent wave propagation properties of fluid filled porous rocks, including the Biot slow wave mechanism and the squirt flow mechanism. In either case, both a frequency dependent velocity as well as a frequency dependent attenuation will result, and both will vary with the pore pressure. Thus, an alternate approach for estimating pore pressure ahead of the BHA is to measure the velocity of the waves traveling through the formation and reflected back to the receivers on the bottom hole assembly as a function of frequency. Following practices which are understood in the geophysical industry, wave propagation velocities as a function of frequency can be determined from the time of arrival of the wave front at the receiver and the empirical velocity-to-pore pressure relationships discussed above can then be used to estimate the pore pressure of the formation ahead of the BHA.

A third embodiment of the method of the present invention allows the estimation of pore pressure from the calculation of the ratio of the measured compressional wave velocity (Vp) to the shear wave velocity (Vs). Measured ultrasonic frequency data suggests that the ratio Vp/Vs increases by approximately 10% as the pore pressure increases from a negligible value up to the confining pressure. See for example, Christensen and Wang, 1985, "The Influence of Pore Pressure and Confining Pressure on Dynamic Elastic Properties of Berea Sandstone," Geophysics, vol. 50, No. 2, pp. 207–213. The Christensen and Wang data relate changes in the confining and pore pressures in a formation to the Poisson's ratio. It will be understood to those skilled in the art that Poisson's ratio can be directly calculated from the ratio of the compressional wave velocity to the shear wave velocity. Thus, in this embodiment of the method of the present invention, pore pressure may be estimated by analysis of the compressional and shear velocities of the received signals described above in conjunction with the Poisson's ratio relationship to pore pressure data such as provided by Christensen and Wang for Berea sandstone.

Figure 4:
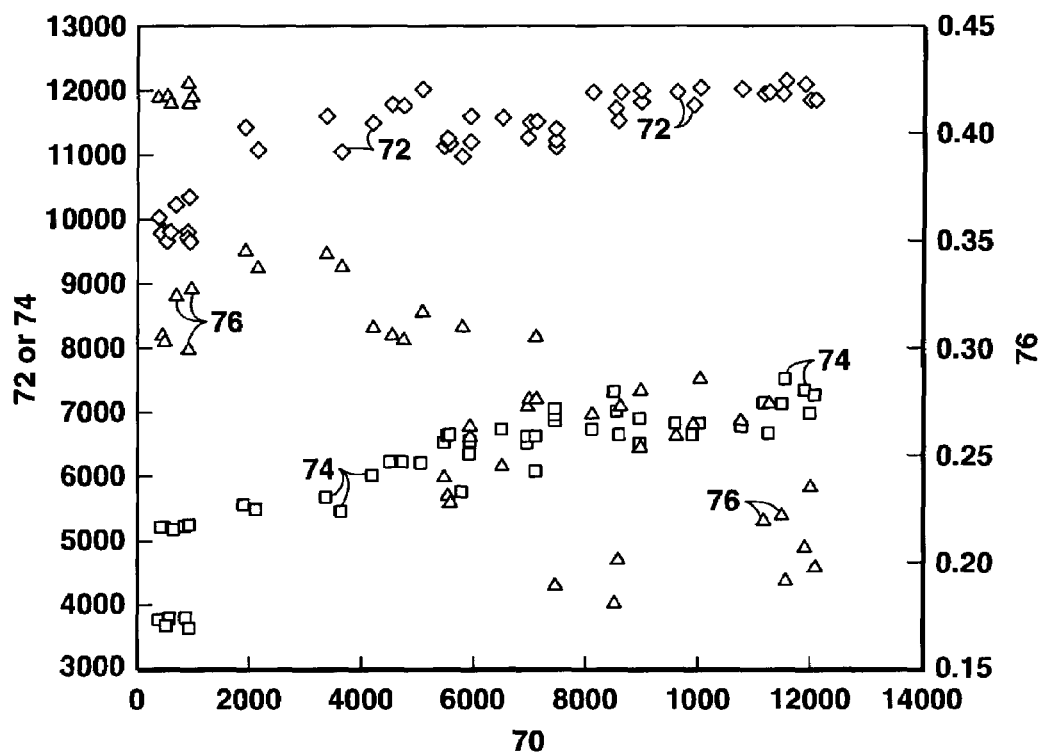
FIG. 4 shows measurement data demonstrating the relationship of compressional wave velocity, shear wave velocity, and Poisson's ratio to effective stress.

It will be understood to those skilled in the art that use of this embodiment of the method of the present invention to estimate pore pressure from the ratio of compressional wave velocity to the shear wave velocity requires data, such as that provided by Christensen and Wang for Berea sandstone, which corresponds generally to the nature of the rocks in the formation in which the bottom hole assembly is deployed. Analogous data for other rock types are available in the literature, for example see Hamilton, E. L., "Vp/Vs and Poisson's Ratios in Marine Sediments and Rocks," J. Acoustic Soc. America, V. 66, No. 4, October 1979, pgs 1093–1101. In addition, FIG. 4 shows data allowing this embodiment to be used for formations comprised of Labette Shale. In this plot the horizontal axis, effective stress 70, is the difference between the mean confining stress and the pore pressure. The left vertical axis indicates both the compressional wave velocity 72 (diamond symbol) and the shear wave velocity 74 (square symbol). The right vertical axis indicates the change in Poisson's Ratio 76 (triangle symbol) as the compressional and shear wave velocities change. Since receivers 16 may be used according to the present embodiment to measure both the compressional wave component of reflected signal 28 and the shear wave component of reflected signal 28, this data allows calculation of the velocity ratio and the estimation of pore pressure.

A further embodiment of the present invention also takes advantage of the ratio of the compressional wave velocity to the shear wave velocity, but in a manner that is less dependent on data corresponding to the specific nature of the rocks in the formation of interest. More specifically, it is understood to those skilled in the art that the shear wave velocity in subsurface formations has a predictable relationship to the ratio of the compressional wave velocity divided by the shear wave velocity. In this further embodiment of the present invention that relationship can be used to calculate pore pressure ahead of a bottom hole assembly, and thereby to calculate the distance to reflectors ahead of a bottom hole assembly, as well as to aid in the prediction of the pressure of overpressured zones. This embodiment derives from applicant's recognition that appropriate specification of the frequencies for the compressional and shear waves allow use of a phase-matching analysis technique to thereby determine the compressional to shear wave velocity ratio at given time windows in the measurement data. For each such window, the parameters of interest, such as distance to reflectors ahead of the bottom hole assembly, can then be calculated from the ratio.

The method of this embodiment is based on several otherwise unrelated concepts which applicant's recognized could be taken advantage of in the present method. First, the distance to a reflector ahead of a bottom hole assembly can be calculated from the product of the velocity of the signal through the formation and the time the signal travels to that reflector. This relationship is independent of the type of the signal, compressional or shear, and from that relationship it can be determined that the ratio of the compressional to the shear wave velocity is the inverse of the ratio of the shear wave's time to a reflector to the compressional wave's time to the reflector. Therefore, determination of the time to reflector ratio of the shear and compressional waves allows determination of the velocity ratio.

Figure 5:
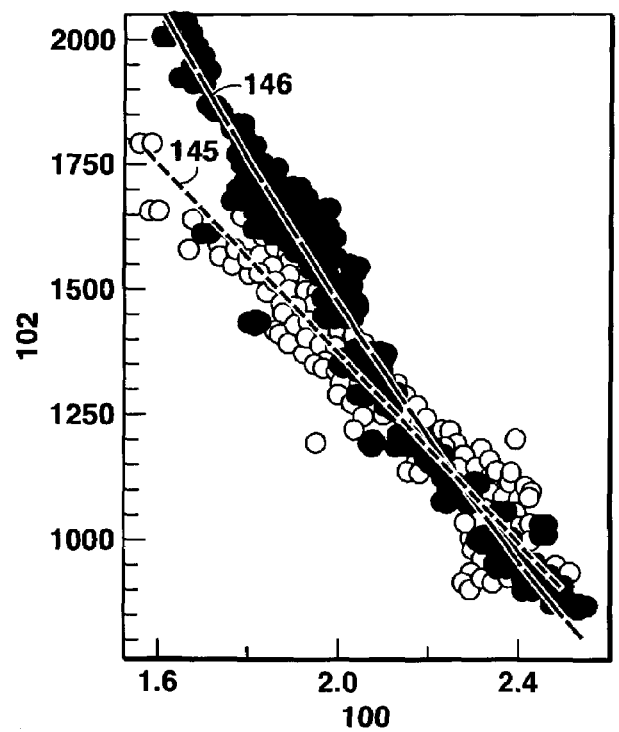
FIG. 5 shows measured data demonstrating the relationship of shear wave velocity (vertical axis, units of meters per second) to the ratio of the compressional wave velocity to the shear wave velocity (horizontal axis, dimensionless).

Second, to take advantage of this ratio, the point in each of the two respective signals which corresponds to the two way travel time to a reflector of interest must be determined. It will be understood to those skilled in the art that the compressional wave velocity is approximately twice that of the shear wave, for example as indicated in the data of FIG. 5. In FIG. 5, the horizontal axis depicts the ratio 100 of the compressional wave velocity to the shear wave velocity, and the vertical axis depicts the shear wave velocity 102, in units of meters per second. Curve 145 represents the normal trend of the relationship of ratio 100 to velocity 102, and curve 146 depicts the reverse trend of the relationship, both of which are described in more detail in the following in conjunction with FIG. 7. Therefore, a signal analysis technique which matches peaks in a compressional wave signal to peaks in a shear wave signal which occur at approximately twice the time scale of the compressional signal would allow determination of the time ratio and thereby the velocity ratio.

However, this relatively simplistic peak matching technique suffers from the challenge that the difference in the amplitudes of the signals will generally make peak matching difficult. Furthermore, because the purpose of the analysis is to determine the time to reflector ratio, relying on the approximation that the time scales differ by a factor of two as a starting point for identifying corresponding peaks involves a subjective analysis component which is preferably avoided. A technique that simplifies the comparison of the two signals is preferable.

This preference is met by applicant's further recognition that the two signals can be made to look approximately identical, taking into account amplitude differences, if the wavelengths of the underlying source signals are appropriately specified. And once the signals are made to look approximately identical, a phase matching technique can be used to accurately specify the time ratio to a given reflector.

More specifically, it is understood to those skilled in the art that the wavelength of a signal is equal to the ratio of its wave velocity to its frequency. Recognizing this fact, and further recognizing the compressional to shear wave velocity ratio of approximately two, it will be apparent to one skilled in the art that the wavelengths of the signals will be approximately identical if the compressional wave frequency is twice the shear wave frequency. For two signals whose wavelengths are approximately the same, phase-matching can be used to accurately determine the relationship of the two-way travel time to a reflector of interest of a first of the two signals to the two-way travel time to the reflector of the second of the two signals. Once that relationship has been determined, the generally understood relationship between travel time ratio and velocity ratio can be used to determine the velocity ratio, and thereby the shear wave velocity. Thereafter, other properties of interest ahead of the formation can be determined.

According to this embodiment of the present invention, BHA 12 of FIG. 1 is equipped with a source that can generate both compressional and shear wave signals. BHA 12 will also be equipped with three component receivers. As will be understood to those skilled in the art, the three components to be measured by such receivers include the vertical, in other words compressional, component and both horizontal, in other words shear, components. It will be further understood that vertical and compressional refer to along the direction of propagation of the signal, and perpendicular to that direction, respectively, which will only be vertical and horizontal in an absolute sense if the borehole is vertical. This source will emit compressional and shear waves in sequence—in a first mode, energy is emitted as a compressional wave, for example with a frequency centered at sixty Hz. The compressional component of the receiver will receive the compressional signals reflected ahead of the bottom hole assembly. Subsequently, in a second mode, energy is emitted as a shear wave, for example at a center frequency of thirty Hz. The shear component of the receiver will receive the shear signals reflected ahead of the bottom hole assembly. This frequency ratio results in approximately the same wavelength for each transmitted and received signal.

Figure 6:
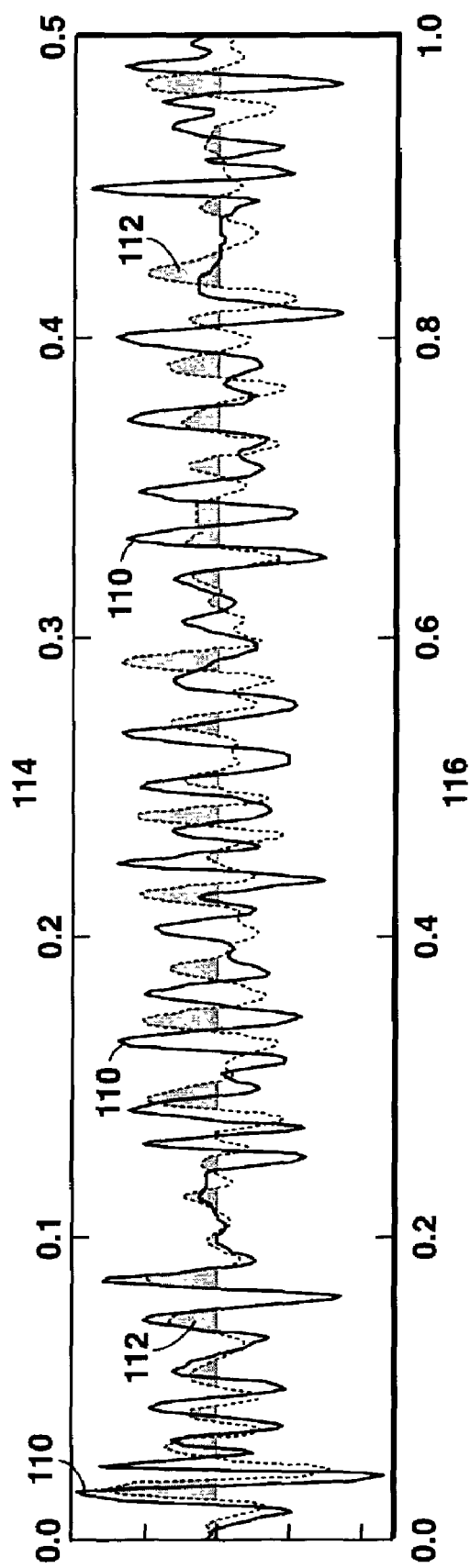
FIG. 6 shows an example of phase matching of simulated compressional and shear wave signals having approximately identical wavelengths, where the upper horizontal axis 114 is the compressional wave time scale in seconds and the lower horizontal axis 116 is the shear wave time scale in seconds. For convenience, the amplitude, vertical axis, of the simulated signals is omitted.

FIG. 6 provides an example of this phase matching capability. This example time series derives from a mathematical model of a formation having 370 layers, and a simulated bottom hole assembly having a source with a compressional wave frequency of sixty hertz, and a shear wave frequency of thirty hertz. The continuous line signal 110 is the simulated compressional wave. Signal 112, depicted with the dotted line and with shaded positive peaks, is the simulated shear wave. The time scale 116 of the shear wave, lower scale in the figure, is twice the time scale 114 of the compressional wave, the upper scale in the figure. In this example the amplitude of the shear wave signal 112 has been adjusted to approximately correspond to the amplitude of the compressional wave signal 110 (For convenience, the units of amplitude, e.g. the vertical axis, have been omitted). It can be observed that a shear wave arrival time 116 of between 0.15 and 0.2 seconds, the phase of the compressional and the shear waves are approximately identical. This conclusion derives from the observation that essentially the entire cycle of each time series in this time window coincides with the other time series. This result indicates that the time scale ratio assumption of two, and thereby the velocity ratio assumption of two, is accurate for travel-times to reflectors at this depth. For this interval, that ratio of two can be used in combination with the data in FIG. 5 to determine the shear wave velocity, and from that value the compressional wave velocity can also be determined. These calculations thereby allow determination of the distance to the reflector in this time window, as well as other parameters, such as pore pressure, according to the previously described embodiments of the method of the present invention.

It will also be noted in FIG. 6 that at larger two-way travel time intervals the shear and compressional wave phases are not as closely matched. This is the case for example at shear wave times 116 ranging from 0.3 to 0.6 seconds. This is an indication that the time scale ratio assumption of two is inaccurate for this time interval, but, as will be understood to one skilled in the art, by phase matching the two signals in this window, or subsets of this window, the correct time scale ratio can be determined. This phase matching involves, in essence, the sliding of one time series horizontally until the phase matches the other time series, and thereby determining the time scale ratio for the window.

The application of this embodiment of the method of the present invention is applied over an entire range of depths according to the following procedure. Compressional and shear wave signals are recorded by a bottom hole assembly at a pre-specified data sampling rate, for example but not to be limiting at a data sampling rate of 0.001 seconds. As will be understood to those skilled in the art, it is impractical to attempt to match individual data points from the compressional signal to corresponding data points in the shear signal, and instead, as indicated above, time intervals, also referred to as windows, are matched. Generally, it is preferable to define time intervals within which phase matching will be carried out that encompass at least one wavelength, and preferably two or more wavelengths of the recorded signal. For each such time interval, the signals will be phase matched, for example, by using a least squares fitting technique, to determine the relationship of the time coordinate in the compressional signal to the time coordinate in the shear signal. The least squares fitting technique would, for example, involve repeated calculations for different time scale ratios until the difference in the mean square energy between the two signals is minimized. From that relationship the velocity ratio can be determined from the data in FIG. 5.

Time intervals for the present embodiment can be specified to be of equal width in time, or can be specified such that the width varies between intervals. In the latter case, the energy level across each interval is preferably held relatively constant with the peak of the signal occurring in the center of the interval, so that the maximum portion of the wave energy across each interval is approximately in the center of the interval.

This time interval phase matching procedure is depicted in FIG. 7. In FIG. 7a, shear 135 and compressional 133 received signals are both plotted, along with a shear time scale, left vertical axis 130, and compressional time scale, right vertical axis 132, both in units of seconds. In FIG. 7b, time intervals are indicated which are each approximately 0.2 seconds in duration, using the shear time scale 130. For each interval, the velocity ratio 140 that results from the least square phase matching technique is indicated on the horizontal axis 100. The ratios range from approximately 1.9 for the window from 0.0 to 0.2 seconds to approximately 2.5 for the window from 0.65 to 0.9 seconds.

FIG. 7c repeats the data of FIG. 5, and is used to determine shear wave velocities corresponding to the ratios indicated in FIG. 7b. It will be understood to those skilled in the art that as the ratio Vp/Vs 100 increases with continuing depth, the lower curve 145, which is referred to as the normal trend, extending up to 1750 m/s for a ratio of Vp/Vs=1.6, is used to determine the shear wave velocity for the time interval. At greater depths, however, it will be understood that the ratio increases with depth and the upper curve 146, which is referred to as the reverse trend, of Vp/Vs 100 is used.

After the shear wave velocity is determined from the data in FIG. 7c, the two-way travel time of the shear wave, 130 in FIG. 7B, can be converted to units of distance. (It will be understood that the travel time reference is the two-way travel time relative to the location of the bottom hole assembly in the borehole when the data are acquired. For the data of FIG. 7, the bottom hole assembly was at a depth of 2830 meters below the surface.). Thus, the data allows generation of a plot of depth versus velocity ratio, as in FIG. 7D, in which the vertical axis 150 is depth in meters and the horizontal axis is the velocity ratio from FIG. 7B. Data points 154 in FIG. 7D represent measured Vp/Vs data from an acoustic well log. A generally strong correlation between those measurements and the calculations of the present method is evident. Shear wave signal 152, which is the absolute value of the shear wave signal 135 depicted in FIG. 7A, is also depicted in FIG. 7D. As will be understood to those skilled in the art, the present method provides improved results in regions for which the shear signal strength is highest.

As indicated, the above-described embodiment provides a method of determining distances to reflectors ahead of a bottom hole assembly. The data described in this embodiment can be used for other calculations as well. For example, as discussed above, a key concern in exploratory drilling operations is obtaining accurate knowledge of pore pressure ahead of a bottom hole assembly. In this application of the present embodiment, the effective stress as a function of depth can be determined, and thereby the pore pressure. In this application of the present invention the Vp/Vs ratio that is obtained can be used to determine effective stress using empirical laboratory shale data.

Figure 8C:
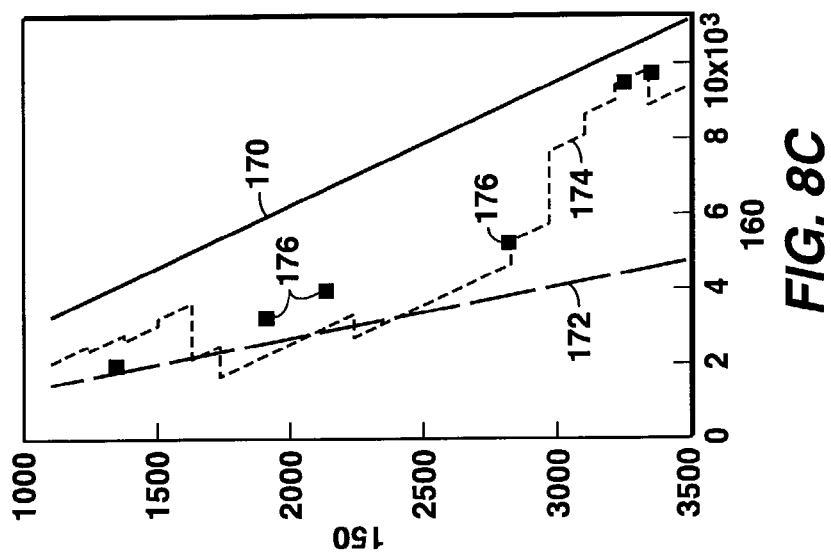
FIG. 8 shows an example of the use of velocity ratio as a function of depth to determine pore pressure as a function of depth.
Figure 8B:
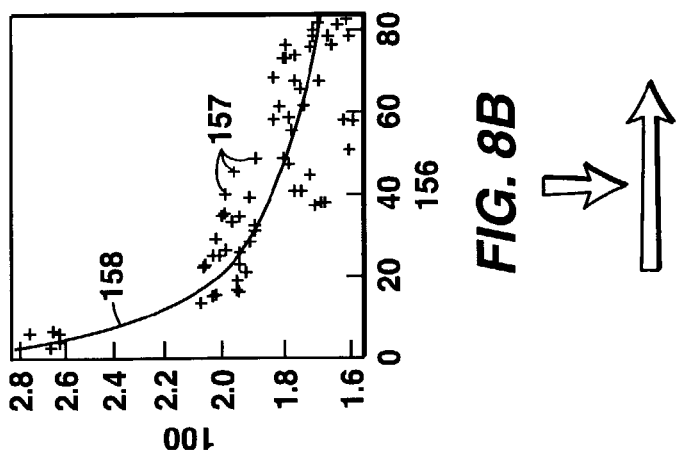
Figure 8A:
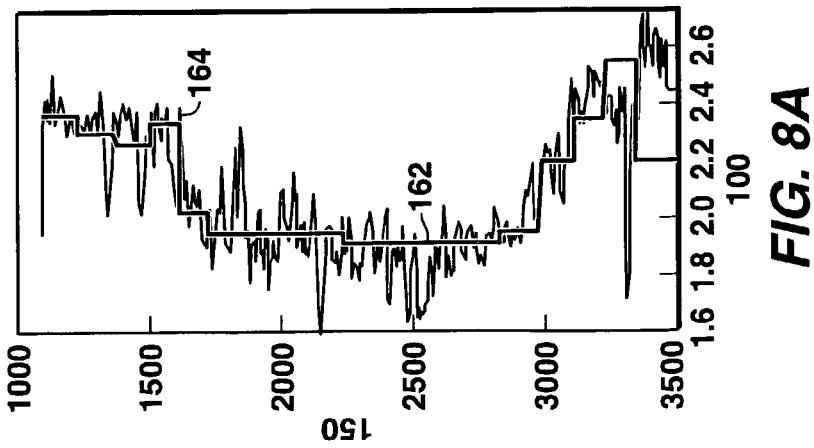

In this embodiment, calculations are initially carried out as depicted in FIG. 8a, which depicts both measured Vp/Vs ratio 164 well data (the irregular signal in the figure) as compared to the data ratio 162 derived from the present method (the step function signal in the figure), as a function of depth 150 in meters.

Next, the data from the present method are combined with data known to those skilled in the art that relates the velocity ratio 100 to effective stress 156 (units of millipascals), as depicted in FIG. 8b, to determine effective stress. Points 157 in FIG. 8b are individual laboratory measurements, and curve 158 is a best fit curve relating velocity ratio 100 to the family of points 157. For any individual velocity ratio calculation depicted in FIG. 8a, curve 158 can be used to determine an effective stress 156 corresponding to the depth for which the velocity ratio was calculated.

Finally, to compute pore pressure of a formation persons skilled in the art will understand that the overburden pressure must first be calculated. That calculation involves the integration of the product of the density and gravitational acceleration from the surface to the specific depth of interest. Density information can be obtained from regional drilling data or from seismic data. The pore pressure at any such given depth is thereby determined by subtracting the effective stress from the overburden pressure.

FIG. 8c depicts the result for the data of FIG. 8a. As will be understood to those skilled in the art, the range of pressures to be expected will generally be bounded by the normal hydrostatic pressure curve 172 and the overburden pressure curve 170, each of which are depicted in FIG. 8c (units of pressure, 160, on the horizontal axis are pounds per square inch). The irregular line 174 in FIG. 8c depicts pore pressure derived from the calculations of the present method, as described in conjunction with FIGS. 8a and 8b. Six measurement points 176 are also indicated. These are points at which direct measurements were made in the well from which the velocity ratio data was obtained. Note the generally very good agreement between the measurements 176 and the calculated line 174 of the present method. Particularly good agreement is depicted at the greater depths, which are the more important depths in drilling operations due to the narrow range between the overburden pressure and pore pressure. The accuracy of the calculations of the present method at such depths is an important distinguishing feature of the present method.

Information on formation properties other than pore pressure may also be obtained with the invention disclosed herein. For example, lithology and fluid content are often estimated from compressional and shear wave signals. These estimates can be made from the signals that are detected and processed according to the present invention, thereby allowing estimation of these properties for the formation adjacent to and ahead of the BHA. In addition, it will be understood that compressional wave velocities may be used to estimate rock strength. Other formation properties that may be determined from the present invention will be known to those skilled in the art.

It will be understood that the present invention is not limited merely to sensing reflected signals from a single reflector, such as reflector 4 in FIG. 1. Rather, as will be understood to those skilled in the art, additional reflectors will generally underlie the first reflector, and signals will reflect from each such additional reflector and be sensed by receivers 16. The present invention may be used to estimate the pore pressure and other formation properties of each such additional reflector.

As noted above, it will be understood in the art that the confidence level associated with the formation property estimates derived from embodiments of the method of the present invention are a function of a number of factors, such as the signal-to-noise ratio of the measured signals and the extent to which the data derived from the literature provide an accurate representation of the correlation of velocity to pore pressure for the subject formation or of the correlation of Poisson's ratio changes to pore pressure. In addition, persons skilled in the art will recognize that certain of the data in the literature derive from measurements made at frequencies higher than the frequencies which are preferably employed in the method of the present invention. Such persons of skill in the art will therefore recognize that increasingly accurate estimates of pore pressure and other formation properties of interest will be generated by ensuring that any such datasets used in the present invention correspond to the expected characteristics of the formations surrounding and ahead of the BHA 12 of the present invention.

It should be understood that the preceding is merely a detailed description of specific embodiments of this invention. Other embodiments may be employed and numerous changes to the disclosed embodiments may be made in accordance with the disclosure herein without departing from the spirit or scope of the present invention. The preceding description, therefore, is not meant to limit the scope of the invention. Rather, the scope of the invention is to be determined only by the appended claims and their equivalents.

We claim:

1. A method of estimating a subsurface formation's velocity ratio using a bottom hole assembly comprising:
   (a) generating a compressional wave having a first wavelength from said bottom hole assembly;
   (b) detecting a compressional wave received signal using said bottom hole assembly;
   (c) generating a shear wave having a second wavelength from said bottom hole assembly;
   (d) detecting a shear wave received signal using said bottom hole assembly; and
   (e) phase matching said detected compressional and shear wave received signals to determine said velocity ratio.

2. The method of claim 1 wherein the ratio of said first wavelength to said second wavelength is approximately two.

3. The method of claim 1 wherein the amplitude of said shear wave received signal is adjusted to approximate the amplitude of said compressional wave received signal before said phase matching.

4. The method of claim 1 wherein said phase matching involves the matching of individual data points between said shear wave received signal and said compressional wave received signal.

5. The method of claim 1 wherein said phase matching involves matching time intervals between said shear wave received signal and said compressional wave received signal.

6. The method of claim 5 wherein said time intervals are approximately of equal width in time.

7. The method of claim 5 wherein each said time interval is determined such that the energy level in said shear wave received signal and said compressional wave received signal is approximately constant throughout said time interval.

8. The method of claim 1 wherein said velocity ratio is used to determine shear wave velocity of said subsurface formation.

9. The method of claim 1 wherein said velocity ratio is used to determine compressional wave velocity of said subsurface formation.

10. The method of claim 8 wherein said shear wave velocity is used to determine two-way travel time to a reflector in said subsurface formation.

11. The method of claim 10 wherein said two-way travel time is used to determine a distance to said reflector.

12. The method of claim 1 wherein said velocity ratio is used to determine effective stress of said subsurface formation.

13. The method of claim 12 wherein said effective stress is used to determine pore pressure of said subsurface formation.

14. The method of claim 13 wherein said pore pressure is calculated as a function of depth.

15. A method of estimating a subsurface formation's velocity ratio using a bottom hole assembly comprising:
    (a) generating a compressional wave having a first wavelength from said bottom hole assembly;
    (b) detecting a compressional wave received signal using said bottom hole assembly;
    (c) generating a shear wave having a second wavelength from said bottom hole assembly, said second wave length being approximately one-half of said first wavelength;
    (d) detecting a shear wave received signal using said bottom hole assembly; and
    (e) phase matching said detected compressional and shear wave received signals to determine said velocity ratio, said phase matching involves matching time intervals between said shear wave received signal and said compressional wave received signal.

16. The method of claim 15 wherein said velocity ratio is used to determine shear wave velocity of said subsurface formation.

17. The method of claim 15 wherein said velocity ratio is used to determine compressional wave velocity of said subsurface formation.

18. The method of claim 16 wherein said shear wave velocity is used to determine two-way travel time to a reflector in said subsurface formation.

19. The method of claim 18 wherein said two-way travel time is used to determine distance to said reflector.

20. The method of claim 15 wherein said velocity ratio is used to determine effective stress of said subsurface formation.

21. The method of claim 20 wherein said effective stress is used to determine pore pressure of said subsurface formation.

22. The method of claim 21 wherein said pore pressure is calculated as a function of depth.

23. A method of continuously estimating pore pressures of a formation ahead of a bottom hole assembly, comprising the steps of:
    (a) generating a compressional wave having a first wavelength from said bottom hole assembly;
    (b) detecting a compressional wave received signal using said bottom hole assembly;
    (c) generating a shear wave having a second wavelength from said bottom hole assembly, said second wavelength being approximately one-half of said first wavelength;
    (d) detecting a shear wave received signal using said bottom hole assembly;
    (e) phase matching said detected compressional and shear wave received signals to determine said velocity ratio, said phase matching involving matching time intervals between said shear wave received signal and said compressional wave received signal;
    (f) using said velocity ratio to determine effective stress of a formation ahead of said bottom hole assembly;
    (g) using said effective stress to determine said pore pressures of said formation ahead of said bottom hole assembly; and
    (h) repeating steps (a) through (g) as said bottom hole assembly moves sequentially downward through said formation.

24. A method of continuously monitoring a wellbore pressure safety margin corresponding to formation ahead of a bottom hole assembly, comprising the steps of:
    (a) generating a compressional wave having a first wavelength from said bottom hole assembly;
    (b) detecting a compressional wave received signal using said bottom hole assembly;
    (c) generating a shear wave having a second wavelength from said bottom hole assembly, said second wavelength being approximately one-half of said first wavelength;
    (d) detecting a shear wave received signal using said bottom hole assembly;
    (e) phase matching said detected compressional and shear wave received signals to determine said velocity ratio, said phase matching involving matching time intervals between said shear wave received signal and said compressional wave received signal;
    (f) using said velocity ratio to determine effective stress of a formation ahead of said bottom hole assembly;
    (g) using effective stress to determine pore pressure of said formation ahead of said bottom hole assembly;
    (h) using said pore pressure to determine a wellbore pressure safety margin of said formation ahead of said bottom hole assembly; and
    (i) repeating steps (a) through (h) as said bottom hole assembly moves sequentially downward through said formation.

25. A method of continuously optimizing weight of drilling mud used in a drilling operation, comprising the steps of:
    (a) detecting a compressional wave received signal using said bottom hole assembly;
    (b) generating a shear wave having a second wavelength from said bottom hole assembly, said second wavelength being approximately one-half of said first wavelength;
    (c) detecting a shear wave received signal using said bottom hole assembly;
    (d) phase matching said detected compressional and shear wave received signals to determine said velocity ratio, said phase matching involves matching time intervals between said shear wave received signal and said compressional wave received signal;
    (e) using said velocity ratio to determine effective stress of a formation ahead of said bottom hole assembly;
    (f) using effective stress to determine pore pressure of said formation ahead of said bottom hole assembly; and
    (g) using said pore pressure to specify a weight of said drilling mud which corresponds to a target wellbore pressure safety margin.

* * * * *

UNITED STATES PATENT AND TRADEMARK OFFICE
CERTIFICATE OF CORRECTION

| | |
|---|---|
| PATENT NO. | : 7,310,580 B2 |
| APPLICATION NO. | : 10/318786 |
| DATED | : December 18, 2007 |
| INVENTOR(S) | : Zhou et al. |

It is certified that error appears in the above-identified patent and that said Letters Patent is hereby corrected as shown below:

Claim 15, column 17, line 27, delete space between "wave" and "length";

Claim 19, column 17, line 48, insert --a-- between "determine" and "distance";

Claim 24, column 18, line 17, insert --a-- between "to" and "formation".

Signed and Sealed this

Twenty-seventh Day of May, 2008

JON W. DUDAS
*Director of the United States Patent and Trademark Office*